(12) United States Patent
Chou et al.

(10) Patent No.: US 11,392,019 B1
(45) Date of Patent: Jul. 19, 2022

(54) OPTICAL ENGINE MODULE AND PROJECTOR

(71) Applicant: DELTA ELECTRONICS, INC., Taoyuan (TW)

(72) Inventors: Yen-I Chou, Taoyuan (TW); Li-Cheng Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/378,760

(22) Filed: Jul. 18, 2021

(30) Foreign Application Priority Data

Mar. 18, 2021 (CN) .......................... 202110291188.X

(51) Int. Cl.
*G03B 21/20* (2006.01)

(52) U.S. Cl.
CPC ....... *G03B 21/2066* (2013.01); *G03B 21/204* (2013.01); *G03B 21/208* (2013.01)

(58) Field of Classification Search
CPC .................................................. G03B 21/208
See application file for complete search history.

(56) References Cited

FOREIGN PATENT DOCUMENTS

| CN | 108781279 A | 11/2018 |
|----|-------------|---------|
| TW | I511576 B | 12/2015 |
| TW | 201835672 A | 10/2018 |
| WO | 2016/165569 A1 | 10/2016 |

*Primary Examiner* — Vip Patel
(74) *Attorney, Agent, or Firm* — CKC & Partners Co., LLC

(57) ABSTRACT

An optical engine module includes a first light source module, a second light source module, and a controller. The first light source module includes a plurality of solid state light emitters. The solid state light emitters are configured to respectively emit different color lights. The second light source module is configured to emit fluorescent light. The controller is configured to: drive the first light source module in a first light emitting mode, in which the color lights are configured to be mixed to produce a first white light; and drive the first light source module and the second light source module in a second light emitting mode, in which the color lights and the fluorescent light are configured to be mixed to produce a second white light.

17 Claims, 12 Drawing Sheets

OPTICAL ENGINE MODULE AND PROJECTOR

CROSS-REFERENCE TO RELATED APPLICATION

This application claims priority to China Application Serial Number 202110291188.X, filed Mar. 18, 2021, which is herein incorporated by reference.

BACKGROUND

Technical Field

The present disclosure relates to an optical engine module and a projector.

Description of Related Art

In recent years, optical projectors have been used in many fields, and the scope of applications is also expanding day by day (e.g., from consumer products to high-tech equipment). Various optical projectors are also widely used in schools, homes and commercial occasions to enlarge the display pattern provided by the signal source and display it on the projection screen.

For the current projectors that use fluorescent light to obtain various color lights, two situations are usually encountered after the fluorescent light passes through the color filter. The first situation is low light utilization rate. If the color filter must meet the specifications for more pure colors in the future, the light utilization rate will be lower. The second situation is that the lower the light utilization rate, the more light will be converted into waste heat, which will also reduce the efficiency of the fluorescent wheel in the projector.

Accordingly, how to provide an optical engine module and a projector to solve the aforementioned problems becomes an important issue to be solved by those in the industry.

SUMMARY

An aspect of the disclosure is to provide an optical engine module and a projector that can efficiently solve the aforementioned problems.

According to an embodiment of the disclosure, an optical engine module includes a first light source module, a second light source module, and a controller. The first light source module includes a plurality of solid state light emitters. The solid state light emitters are configured to respectively emit different color lights. The second light source module is configured to emit fluorescent light. The controller is configured to: drive the first light source module in a first light emitting mode, in which the color lights are configured to be mixed to produce a first white light; and drive the first light source module and the second light source module in a second light emitting mode, in which the color lights and the fluorescent light are configured to be mixed to produce a second white light.

In an embodiment of the disclosure, the optical engine module further includes a band-pass filter element. At least two of the solid state light emitters and the second light source module are optically coupled to the band-pass filter element.

In an embodiment of the disclosure, the solid state light emitters are laser diodes and respectively have different light-emitting spectra. The band-pass filter element has a reflection spectrum. The reflection spectrum is located between adjacent two of the light-emitting spectra.

In an embodiment of the disclosure, a light-emitting spectrum of the fluorescent light covers the reflection spectrum.

In an embodiment of the disclosure, the at least two of the solid state light emitters include a green laser diode and a red laser diode.

In an embodiment of the disclosure, the at least two of the solid state light emitters includes a green laser diode, a red laser diode, and a blue laser diode.

In an embodiment of the disclosure, the second light source module includes a light-emitting unit and a wavelength conversion material. The wavelength conversion material is configured to convert light emitted by the light-emitting unit into the fluorescent light.

In an embodiment of the disclosure, the light-emitting unit and one of the solid state light emitters are blue laser diodes.

In an embodiment of the disclosure, the second light source module uses one of the solid state light emitters as the light-emitting unit.

In an embodiment of the disclosure, the second light source module further includes a substrate. The wavelength conversion material is disposed on the substrate.

In an embodiment of the disclosure, the substrate is a reflective substrate.

In an embodiment of the disclosure, the optical engine module further includes a dichroic mirror. The dichroic mirror is located between the light-emitting unit and the substrate. The dichroic mirror is configured to transmit the light emitted by the light-emitting unit and reflect the fluorescent light.

In an embodiment of the disclosure, the substrate is a transmissive substrate.

In an embodiment of the disclosure, the optical engine module further includes a reflector. The wavelength conversion material and the substrate are located between the light-emitting unit and the reflector. The reflector is configured to reflect the fluorescent light.

In an embodiment of the disclosure, the substrate has a notch. The notch is configured to allow the light emitted by the light-emitting unit to pass through.

According to an embodiment of the disclosure, a projector includes the optical engine module and a projection module. The projection module is configured to: sequentially process the color lights based on a first time sequence in the first light emitting mode; and sequentially process the color lights and the fluorescent light based on a second time sequence in the second light emitting mode.

In an embodiment of the disclosure, the projector further includes a homogenizer. The first light source module and the second light source module are optically coupled to the homogenizer independently.

Accordingly, in the optical engine module and the projector of the present disclosure, the first light source module capable of generating different color lights and the second light source module capable of generating fluorescent light are controlled by the controller, so that a first white light and a second white light can be mixed corresponding to a first light emitting mode and a second light emitting mode, respectively. In this way, the optical engine module and the projector of the present disclosure can obtain the maximum benefit of each light emitting mode.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
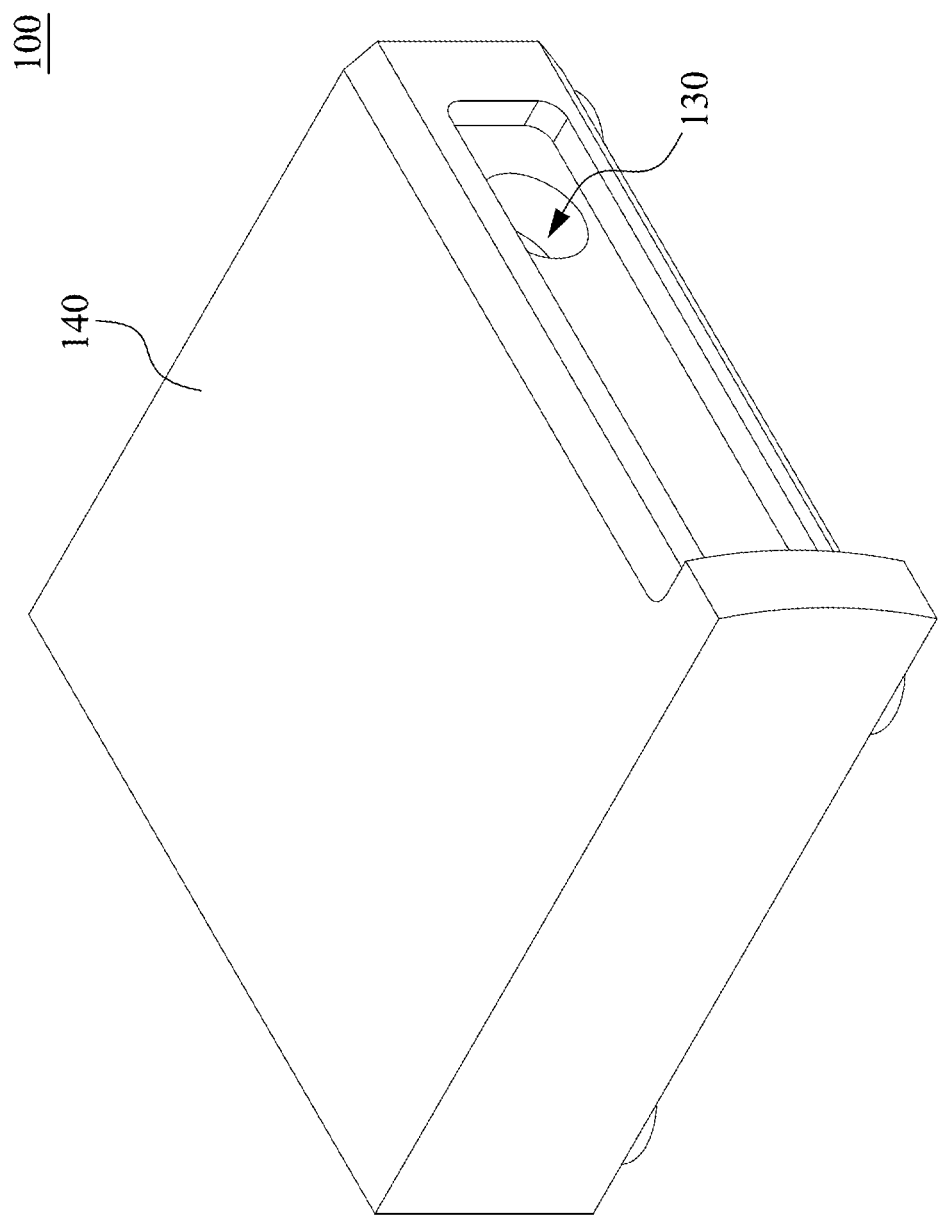
FIG. 1 is a perspective view of a projector according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
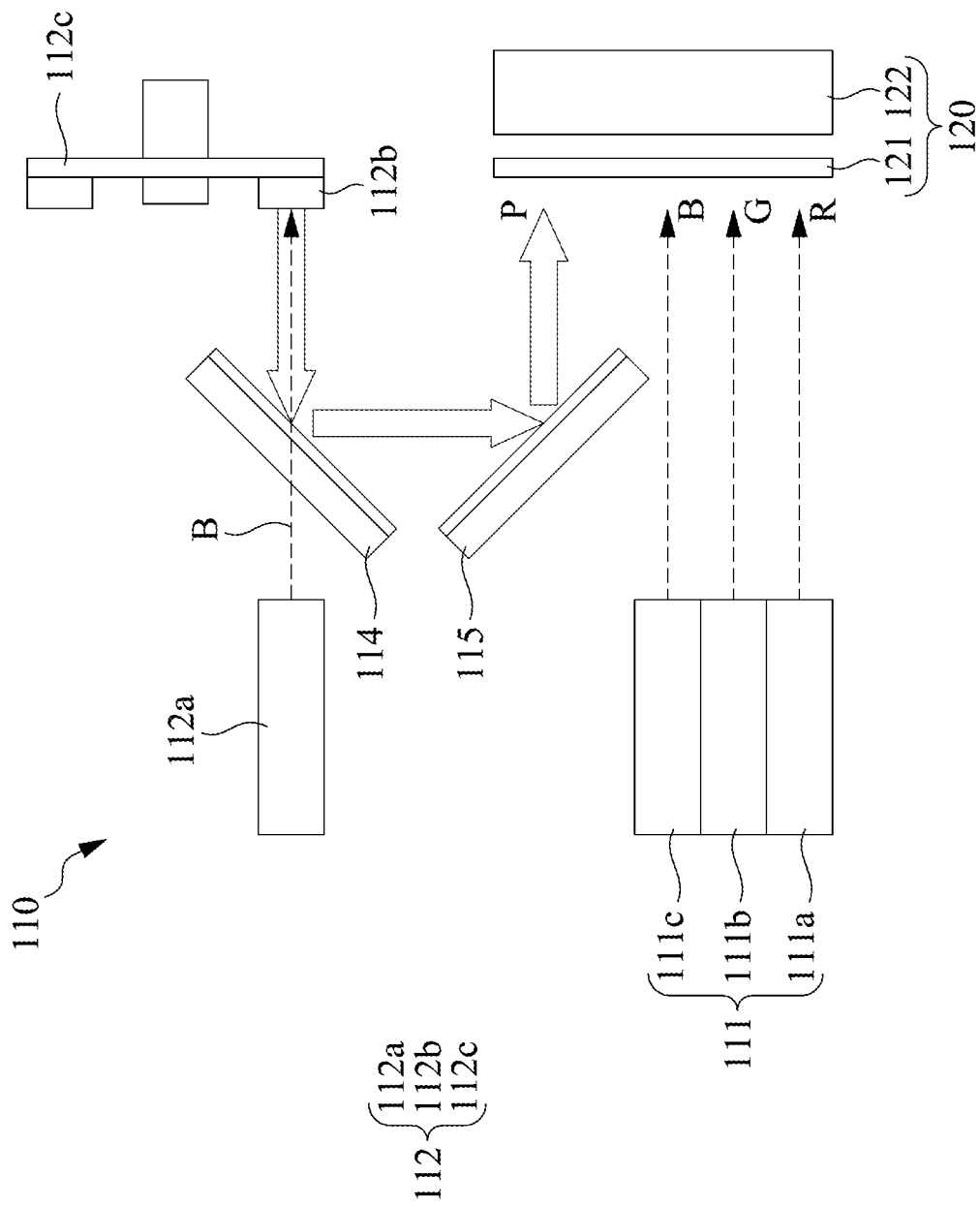
FIG. 2 is a schematic diagram of an optical engine module and a homogenizer according to an embodiment of the present disclosure.
Figure 3:
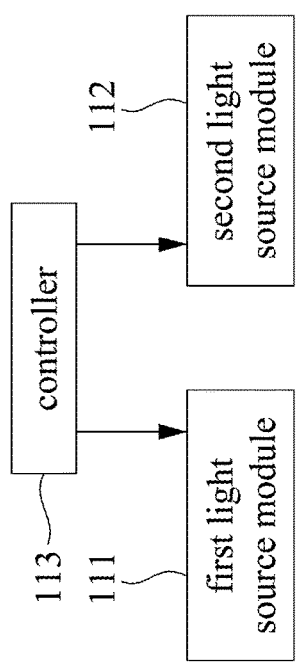
FIG. 3 is a functional block diagram of components included in the optical engine module according to an embodiment of the present disclosure.

Reference is made to FIGS. 1 to 3. FIG. 1 is a perspective view of a projector 100 according to an embodiment of the present disclosure. FIG. 2 is a schematic diagram of an optical engine module 110 and a homogenizer 120 according to an embodiment of the present disclosure. FIG. 3 is a functional block diagram of components included in the optical engine module 110 according to an embodiment of the present disclosure. As shown in FIGS. 1 to 3, in the present embodiment, the projector 100 includes an optical engine module 110, a homogenizer 120, a projection module 130, and a housing 140. The optical engine module 110, the homogenizer 120, and the projection module 130 are disposed in the housing 140. The optical engine module 110 includes a first light source module 111, a second light source module 112, and a controller 113. The first light source module 111 includes a plurality of solid state light emitters 111a, 111b, 111c. The solid state light emitters 111a, 111b, 111c are configured to respectively emit different color lights. For example, the solid state light emitter 111a is configured to emit red light R, the solid state light emitter 111b is configured to emit green light G, and the solid state light emitter 111c is configured to emit blue light B. The second light source module 112 is configured to emit fluorescent light P. The controller 113 is configured to: drive the first light source module 111 in a first light emitting mode, in which the color lights (i.e., the red light R, the green light G, and the blue light B) are configured to be mixed to produce a first white light; and drive the first light source module 111 and the second light source module 112 in a second light emitting mode, in which the color lights and the fluorescent light P are configured to be mixed to produce a second white light.

Figure 4:
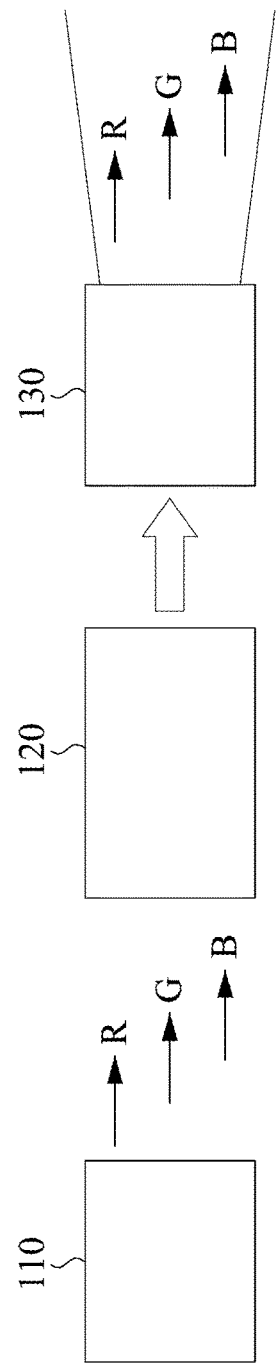
FIG. 4 is a schematic diagram showing operation of the projector in a first light emitting mode according to an embodiment of the present disclosure.

Reference is made to FIG. 4. FIG. 4 is a schematic diagram showing operation of the projector 100 in the first light emitting mode according to an embodiment of the present disclosure. As shown in FIG. 4, when the projector 100 operates in the first light emitting mode, the controller 113 of the optical engine module 110 only drives the first light source module 111 to sequentially emit the red light R, the green light G, and the blue light B. The red light R, the green light G, and the blue light B reach the projection module 130 through the homogenizer 120. The homogenizer 120 is configured to homogenize the red light R, the green light G, and the blue light B. The projection module 130 is configured to sequentially process the red light R, the green light G, and the blue light B based on a first time sequence in the first light emitting mode. Specifically, the projection module 130 is configured to sequentially project the red light R, the green light G, and the blue light B to predetermined positions in the first light emitting mode.

Figure 5:
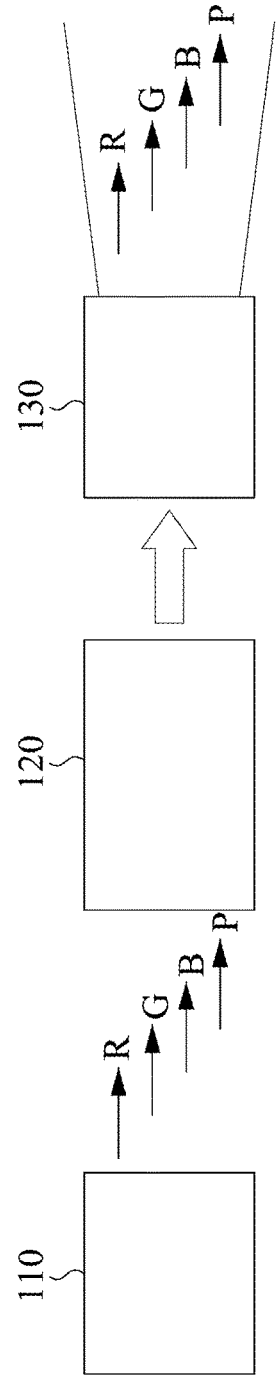
FIG. 5 is a schematic diagram showing operation of the projector in a second light emitting mode according to an embodiment of the present disclosure.

Reference is made to FIG. 5. FIG. 5 is a schematic diagram showing operation of the projector 100 in the second light emitting mode according to an embodiment of the present disclosure. As shown in FIG. 5, when the projector 100 operates in the second light emitting mode, the controller 113 of the optical engine module 110 drives the first light source module 111 and the second light source module 112 to sequentially emit the red light R, the green light G, the blue light B, and fluorescent light P. The homogenizer 120 is configured to homogenize the red light R, the green light G, the blue light B, and the fluorescent light P. The projection module 130 is configured to sequentially process the red light R, the green light G, the blue light B, and the fluorescent light P based on the second time sequence in the second light emitting mode. Specifically, the projection module 130 is configured to sequentially project the red light R, the green light G, the blue light B, and the fluorescent light P to predetermined positions in the second light emitting mode. It can be seen from the above description that when the projector 100 operates in the first light emitting mode, the red light R, the green light G, and the blue light B are used for light mixing, so that high chroma can be exhibited. When the projector 100 operates in the second light emitting mode, since the fluorescent light P is additionally used for light mixing, not only can the brightness be increased, but also the efficiency can be improved (which will be described in detail in conjunction with Table 1 and Table 2 below).

In some embodiments, as shown in FIG. 2, the homogenizer 120 includes a diffuser 121 and an integrating rod 122. The red light R, the green light G, the blue light B, and fluorescent light P sequentially arrive at the projection module 130 via the diffuser 121 and the integrating rod 122.

In some embodiments, the projection module 130 includes a digital micromirror device (DMD), but the disclosure is not limited in this regard.

In some embodiments, the solid state light emitters 111a, 111b, 111c include a red laser diode, a green laser diode, and a blue laser diode, but the disclosure is not limited in this regard.

As shown in FIG. 2, in some embodiments, the second light source module 112 includes a light-emitting unit 112a, a wavelength conversion material 112b, and a substrate 112c. The wavelength conversion material 112b is disposed on the substrate 112c. The wavelength conversion material 112b is configured to convert light emitted by the light-emitting unit 112a into the fluorescent light P. For example, the light-emitting unit 112a is configured to emit the blue light B. The wavelength conversion material 112b is configured to convert the blue light B into yellow fluorescent light P.

In some embodiments, the light-emitting unit 112a is a blue laser diode, and the wavelength conversion material 112b includes YAG phosphor or nitride phosphor, but the disclosure is not limited in this regard.

As shown in FIG. 2, in the present embodiment, the optical engine module 110 further includes a dichroic mirror 114 and a reflector 115. The dichroic mirror 114 is located between the light-emitting unit 112a of the second light source module 112 and the wavelength conversion material 112b, and the wavelength conversion material 112b is located between the dichroic mirror 114 and the substrate 112c. In some embodiments, as shown in FIG. 2, the dichroic mirror 114 is composed of a glass substrate and a dichroic layer disposed on a surface of the glass substrate. The dichroic mirror 114 is configured to transmit the light emitted by the light-emitting unit 112a, so that the light reaches the wavelength conversion material 112b and is converted into the fluorescent light P. In the present embodiment, the substrate 112c is a reflective substrate, so the fluorescent light P will be reflected back to the dichroic mirror 114. The dichroic mirror 114 is further configured to reflect the fluorescent light P to the reflector 115. The reflector 115 is configured to reflect the fluorescent light P to the homogenizer 120. With the aforementioned optical configuration, the optical path design can be made compact, so as to effectively reduce the space occupied by the optical engine module 110 in the projector 100.

In some embodiments, the reflector 115 is a reflective mirror or another dichroic mirror, but the disclosure is not limited in this regard.

In some embodiments, the substrate 112c can be a rotatable substrate or a fixed substrate.

With the aforementioned optical configuration, the optical engine module 110 of the present embodiment and the projector 100 apply the same can obtain the maximum benefit of each of the various light emitting modes. The following is an explanation with the experimental data in Table 1 and Table 2.

Table 1 shows the data detected in the experiment of an optical engine module A using a set of first light source module 111 and an optical engine module B using two sets of first light source modules 111:

TABLE 1

|  | Optical engine module A | Optical engine module B |
| --- | --- | --- |
| Total brightness (lm) | 7770 | 15540 |
| Fluorescent brightness ratio (%) | 0 | 0 |
| Efficiency (%) | 100 | 100 |

Table 2 shows the data detected in the experiment of the optical engine module 110 using a set of first light source module 111 and a set of second light source module 112 in the present embodiment:

TABLE 2

|  | Optical engine module 110 of present embodiment | | | | |
| --- | --- | --- | --- | --- | --- |
| Total brightness (lm) | 8016 | 10337 | 13571 | 15969 | 19914 |
| Fluorescent brightness ratio (%) | 52 | 41 | 59 | 50 | 59 |
| Efficiency (%) | 106.7 | 105.6 | 105.7 | 105.7 | 105.6 |

It should be noted that the efficiency of the optical engine module 110 in each embodiment in Table 2 is calculated based on the efficiencies of the optical engine module A and the optical engine module B in Table 1. The efficiency in Table 1 and Table 2 refers to the efficiency of a light source converting consumed electric energy into light, and is usually expressed as the ratio of luminous flux (lm/lumen) to power consumption (Watt). It can be seen from Table 1 and Table 2 above that compared with the optical engine modules A and B that only use one or two sets of first light source modules 111, the optical engine module 110 of the present embodiment (i.e., using a set of first light source module 111 and a set of second light source module 112) has a better efficiency performance (about 5 to 6% higher) in the brightness range of about 7000 lm to about 20000 lm. In addition, from Table 1 and Table 2 above, the fluorescent brightness ratio of the optical engine module 110 of the present embodiment accounts for about 40% to about 70%, and the total brightness can be increased by about 25% to about 30% compared to the optical engine module B.

Figure 6:
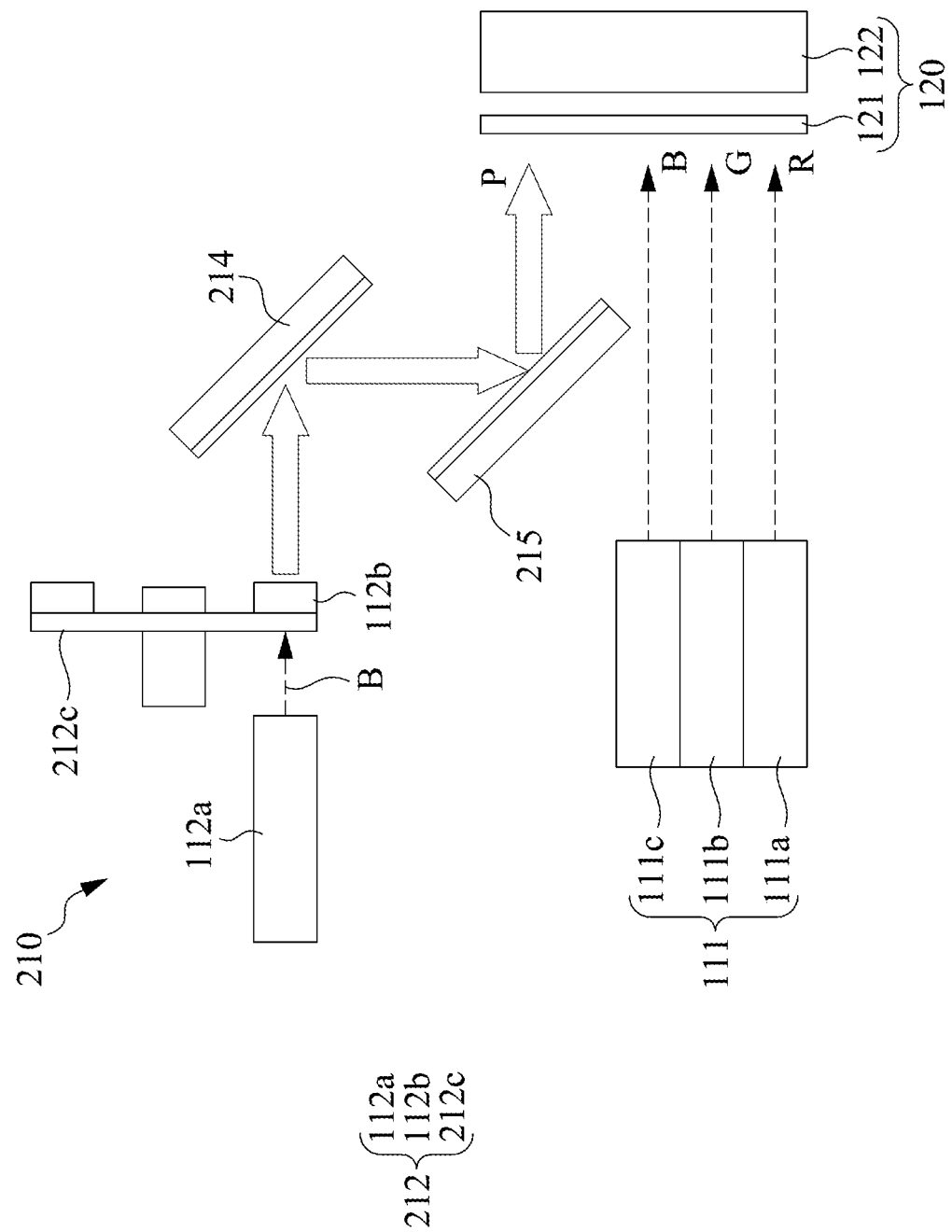
FIG. 6 is a schematic diagram of an optical engine module and the homogenizer according to another embodiment of the present disclosure.

Reference is made to FIG. 6. FIG. 6 is a schematic diagram of an optical engine module 210 and the homogenizer 120 according to another embodiment of the present disclosure. As shown in FIG. 6, in the present embodiment, the optical engine module 210 includes a first light source module 111, a second light source module 212, and reflectors 214, 215, in which the first light source module 111 is the same as that in the embodiment shown in FIG. 2, so it will not be introduced again here, and reference may be made to the foregoing related introduction. The second light source module 212 includes a light-emitting unit 112a, a wavelength conversion material 112b, and a substrate 212c, in which the light-emitting unit 112a and the wavelength conversion material 112b are the same as those in the embodiment shown in FIG. 2, so they will not be introduced again here, and reference may be made to the foregoing related introduction. A difference between the present embodiment and the embodiment shown in FIG. 2 is that the substrate 212c of the second light source module 212 of the present embodiment is a transmissive substrate, and the wavelength conversion material 112b and the substrate 212c are located between the light-emitting unit 112a and the reflector 214. Hence, the substrate 212c is configured to transmit the light emitted by the light-emitting unit 112a, so that the light reaches the wavelength conversion material 112b and is converted into the fluorescent light P. The fluorescent light P is then sequentially reflected by the reflectors 214 and 215 to reach the homogenizer 120. With this optical configuration, the optical path design can also be made compact, so as to effectively reduce the space occupied by the optical engine module 210 in the projector 100.

In some embodiments, at least one of the reflectors 214 and 215 is a reflective mirror or a dichroic mirror, but the disclosure is not limited in this regard.

Figure 7:
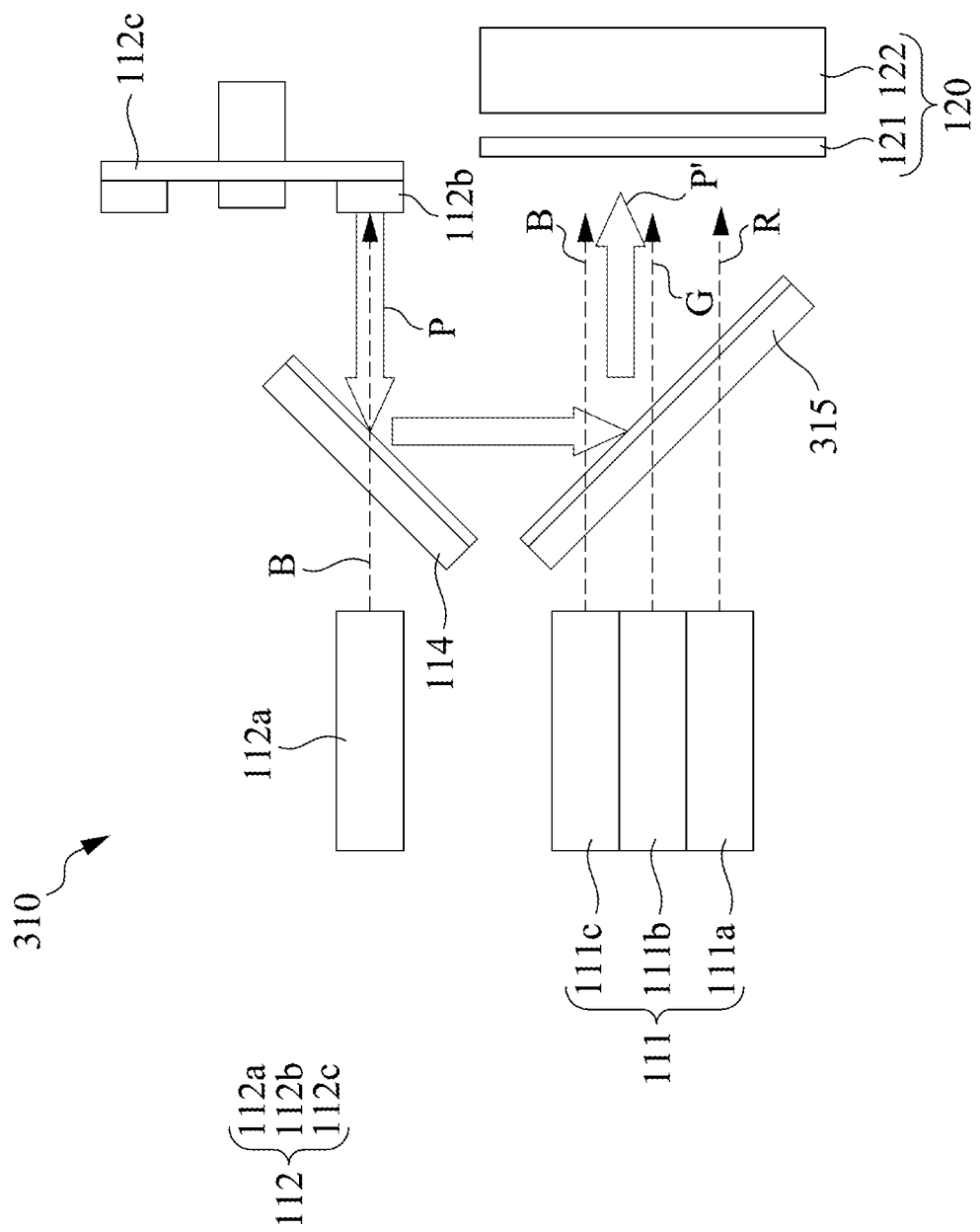
FIG. 7 is a schematic diagram of an optical engine module and the homogenizer according to another embodiment of the present disclosure.

Reference is made to FIG. 7. FIG. 7 is a schematic diagram of an optical engine module 310 and the homogenizer 120 according to another embodiment of the present disclosure. As shown in FIG. 7, in the present embodiment, the optical engine module 310 includes a first light source module 111, a second light source module 112, a dichroic mirror 114, and a band-pass filter element 315, in which the first light source module 111, the second light source module 112, and the dichroic mirror 114 are the same as those in the embodiment shown in FIG. 2, so they will not be introduced again here, and reference may be made to the foregoing related introduction. A difference between the present embodiment and the embodiment shown in FIG. 2 is that in the present embodiment, the band-pass filter element 315 is used to replace the reflector 115 in FIG. 2. In addition, compared to the first light source module 111 and the second light source module 112 that are optically coupled to the homogenizer 120 independently in the embodiment shown in FIG. 2, the first light source module 111 and the second light source module 112 in the present embodiment are both optically coupled to the band-pass filter element 315 and optically coupled to the homogenizer 120 through the band-pass filter element 315. With this optical configuration, the optical path design can be made more compact, so as to further reduce the space occupied by the optical engine module 310 in the projector 100.

Figure 8:
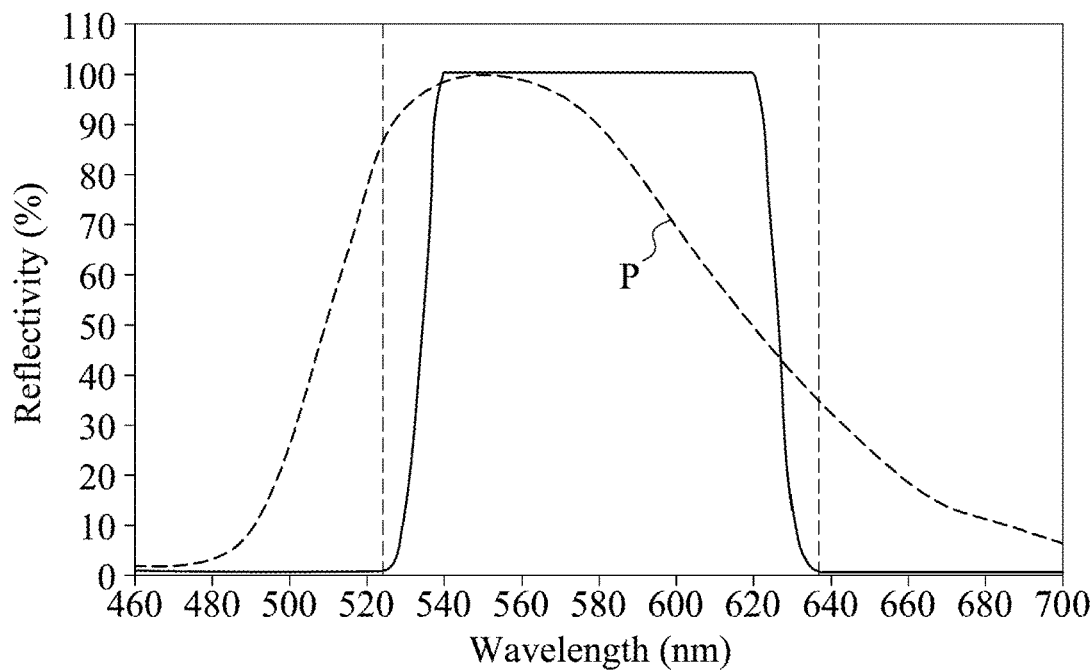
FIG. 8 is a graph showing a wavelength-reflectivity curve of a band-pass filter element.
Figure 9:
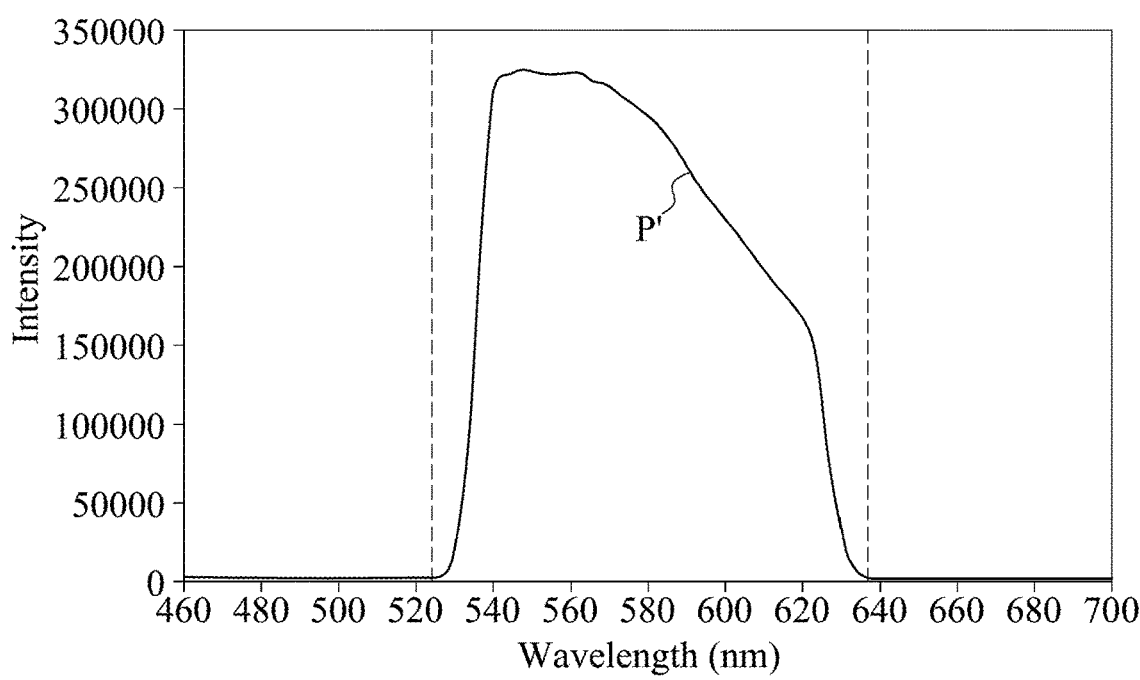
FIG. 9 is a graph showing a wavelength-intensity curve of fluorescent light reflected by the band-pass filter element.

Reference is made to FIGS. 8 and 9. FIG. 8 is a graph showing a wavelength-reflectivity curve of the band-pass filter element 315. FIG. 9 is a graph showing a wavelength-intensity curve of fluorescent light P' reflected by the band-pass filter element 315. As shown in FIG. 8, the solid line represents the wavelength-reflectivity curve of the band-pass filter element 315, and the dotted line represents the wavelength-intensity curve of the fluorescent light P converted by the wavelength conversion material 112b. Therefore, after the fluorescent light P reaches the band-pass filter element 315, the wavelength-intensity curve as shown in FIG. 9 can be obtained from the fluorescent light P' reflected by the band-pass filter element 315. In other words, a light-emitting spectrum of the fluorescent light P covers a reflection spectrum of the band-pass filter element 315, so the fluorescent light P partially passes through the band-pass filter element 315 and is partially reflected by the band-pass filter element 315.

Figure 10:
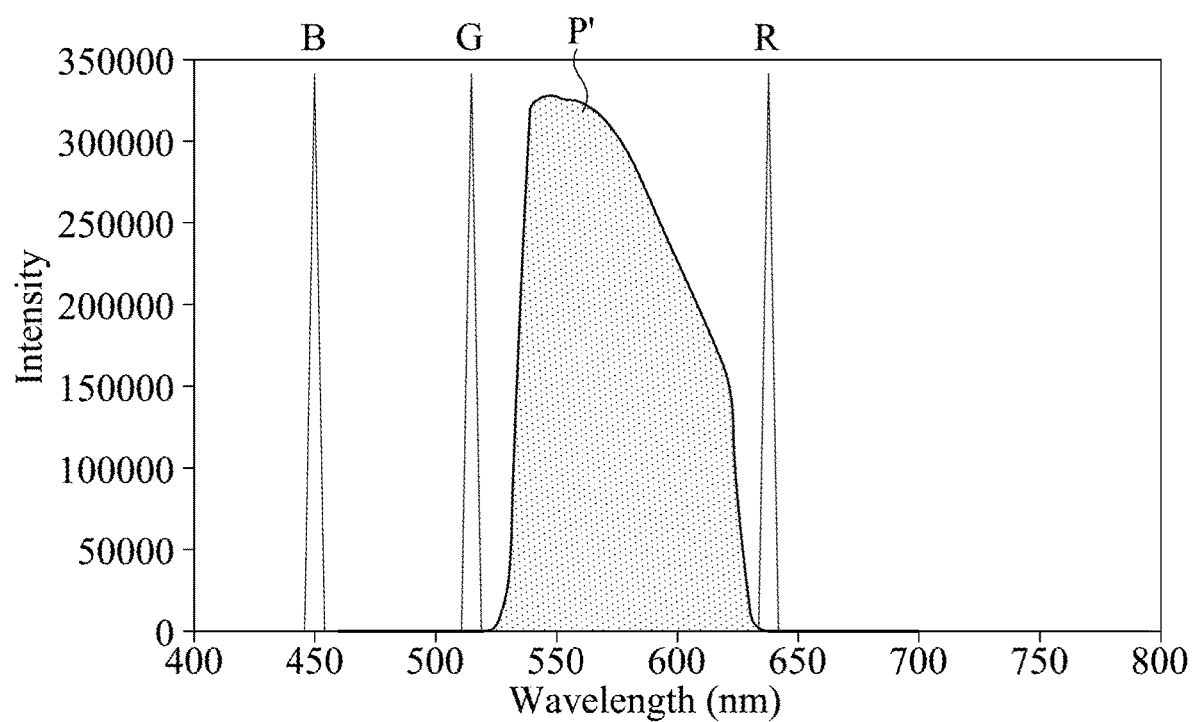
FIG. 10 is a graph showing wavelength-intensity curves of different color lights passing through the band-pass filter element and the fluorescent light reflected by the band-pass filter element.

Reference is made to FIG. 10. FIG. 10 is a graph showing wavelength-intensity curves of different color lights passing through the band-pass filter element 315 and the fluorescent light P' reflected by the band-pass filter element 315. According to FIG. 8 and FIG. 10, the wavelength-intensity curves of the red light R, the green light G, and the blue light B do not overlap with the wavelength-reflectivity curve of the band-pass filter element 315, so the red light R, the green light G, and the blue light B can pass through the band-pass filter element 315. In addition, the wavelength-intensity curves of the red light R, the green light G, and the blue light B do not overlap with the wavelength-intensity curve of the fluorescent light P' reflected by the band-pass filter element 315. In other words, the red light R, the green light G, and the blue light B have different light-emitting spectra, and the reflection spectrum of the band-pass filter element 315 is located between the light-emitting spectra of the red light R and the green light G. Hence, purer yellow light can be filtered out from the fluorescent light P converted by the wavelength conversion material 112b by the band-pass filter element 315, so as to facilitate the expansion of the color gamut of the second white light mixed by the red light R, the green light G, the blue light B, and the fluorescent light P'.

Figure 11:
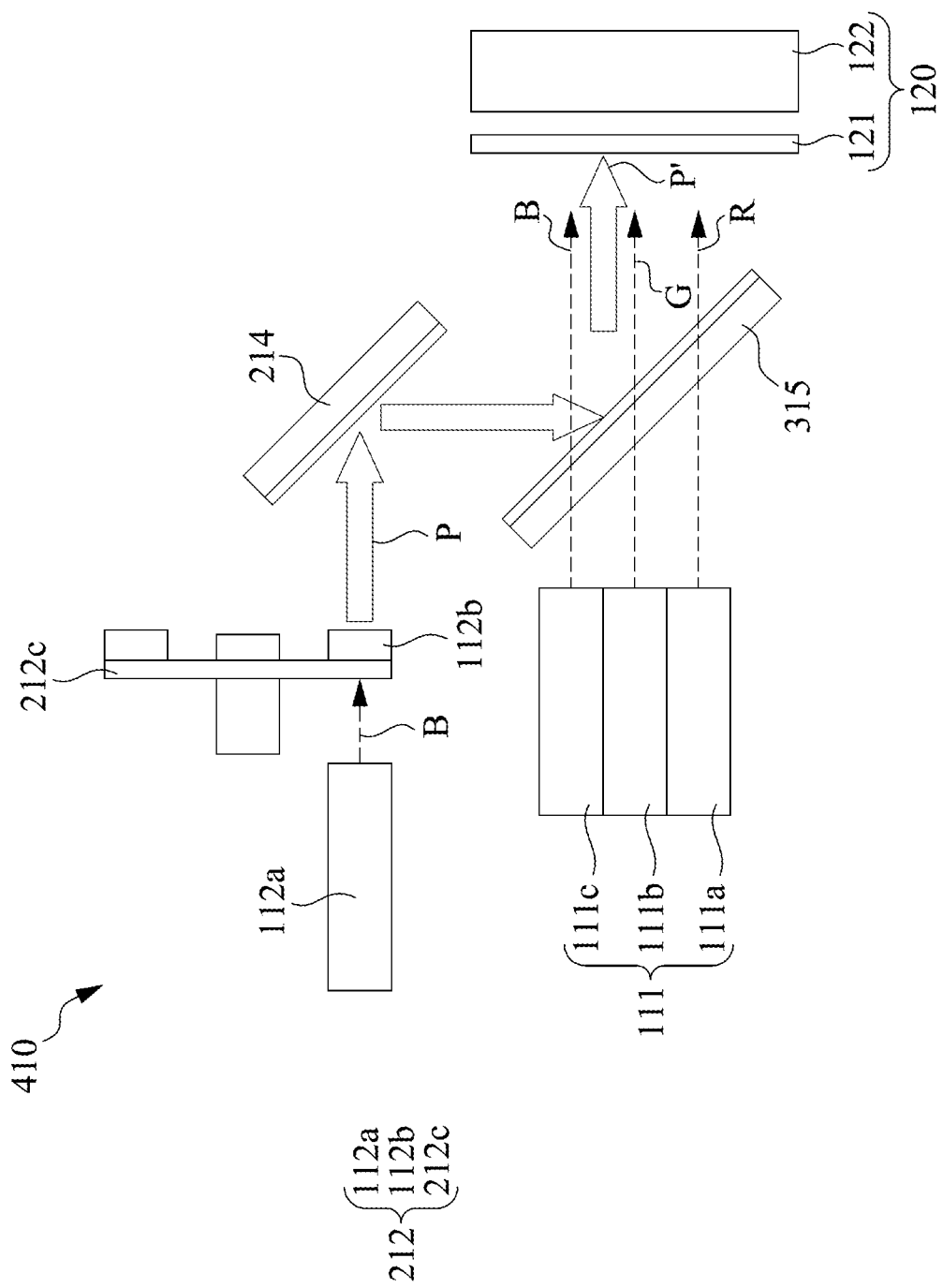
FIG. 11 is a schematic diagram of an optical engine module and the homogenizer according to another embodiment of the present disclosure.

Reference is made to FIG. 11. FIG. 11 is a schematic diagram of an optical engine module 410 and the homogenizer 120 according to another embodiment of the present disclosure. As shown in FIG. 11, in the present embodiment, the optical engine module 410 includes a first light source module 111, a second light source module 212, a reflector 214, and a band-pass filter element 315, in which the first light source module 111 and the band-pass filter element 315 are the same as those in the embodiment shown in FIG. 7 and the second light source module 212 is the same as that in the embodiment shown in FIG. 6, so they will not be introduced again here, and reference may be made to the foregoing related introduction. In short, the substrate 212c of the second light source module 212 of the present embodiment is configured to transmit the light emitted by the light-emitting unit 112a, so that the light reaches the wavelength conversion material 112b and is converted into the fluorescent light P. The fluorescent light P is then sequentially reflected by the reflector 214 and the band-pass filter element 315 (and is filtered into fluorescent light P') to reach the homogenizer 120. With this optical configuration, the optical path design can also be made more compact, so as to further reduce the space occupied by the optical engine module 410 in the projector 100.

Figure 12:
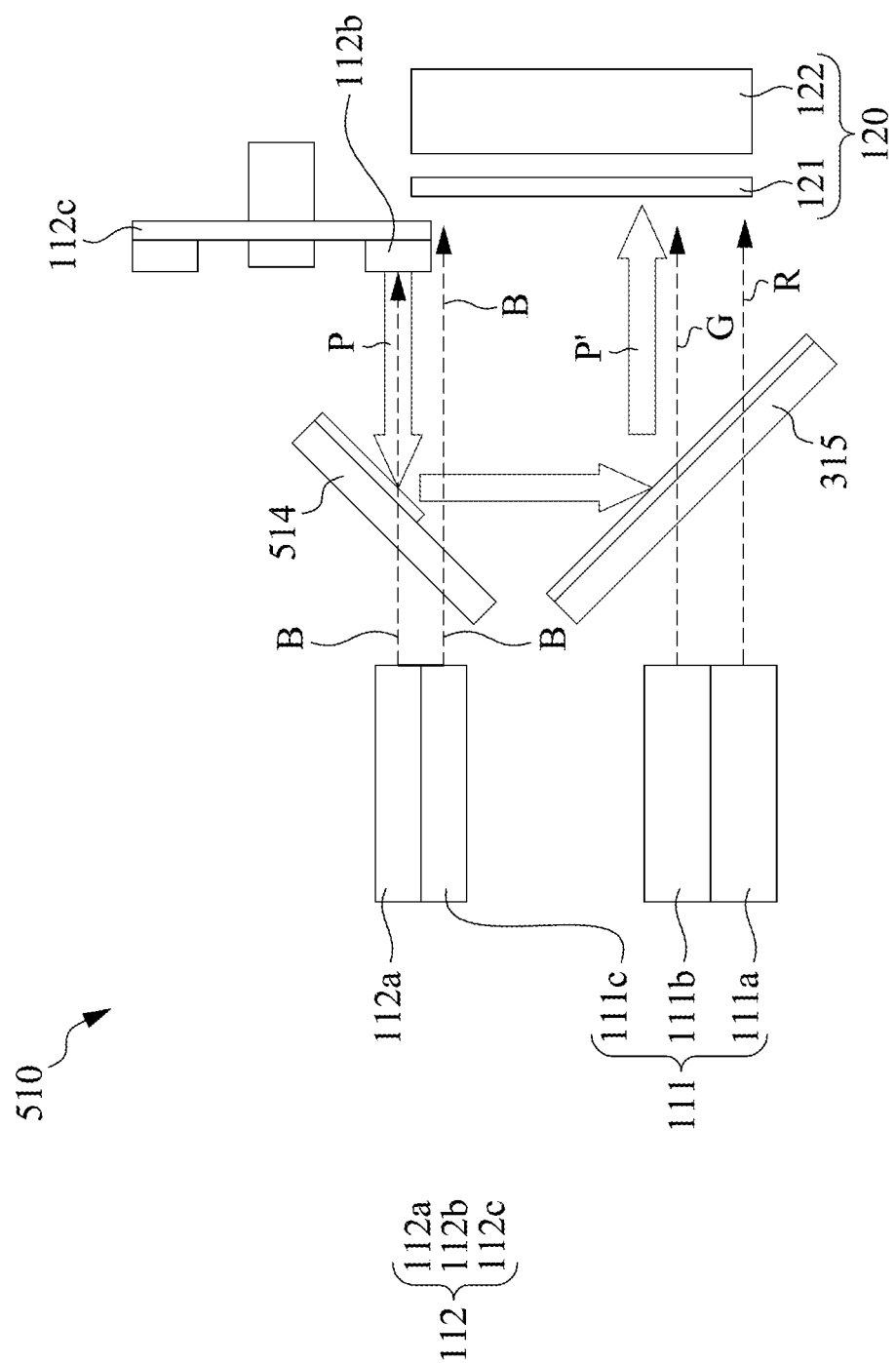
FIG. 12 is a schematic diagram of an optical engine module and the homogenizer according to another embodiment of the present disclosure.

Reference is made to FIG. 12. FIG. 12 is a schematic diagram of an optical engine module 510 and the homogenizer 120 according to another embodiment of the present disclosure. As shown in FIG. 12, in the present embodiment, the optical engine module 510 includes a first light source module 111, a second light source module 112, a dichroic mirror 514, and a band-pass filter element 315, in which the solid state light emitters 111a, 111b of the first light source module 111, the light-emitting unit 112a of the second light source module 112, and the band-pass filter element 315 are the same as or similar to those in the embodiment shown in FIG. 7, so they will not be introduced again here, and reference may be made to the foregoing related introduction. A difference between the present embodiment and the embodiment shown in FIG. 7 is that in the present embodiment, the solid state light emitter 111c of the first light source module 111 and the light-emitting unit 112a of the second light source module 112 are disposed adjacently and far away from the solid state light emitters 111a, 111b of the first light source module 111. For example, the solid state light emitter 111c of the first light source module 111 and the light-emitting unit 112a of the second light source module 112 may be two adjacent laser diodes disposed in the same light emitter, and the solid state light emitters 111a, 111b of the first light source module 111 may be two adjacent laser diodes disposed in another light emitter.

Another difference between the present embodiment and the embodiment shown in FIG. 7 is that a part of the dichroic mirror 514 (for example, the upper half) in the present embodiment has a light-splitting function. Specifically, this part of the dichroic mirror 514 is configured to transmit the light emitted by the light-emitting unit 112a, and is configured to reflect the fluorescent light P converted by the wavelength conversion material 112b to the band-pass filter element 315. In addition, another part of the dichroic mirror 514 (for example, the lower half) in the present embodiment does not have the light-splitting function. Specifically, this part of the dichroic mirror 514 is only configured to transmit the light emitted by the solid state light emitter 111c of the first light source module 111 to reach the homogenizer 120, and cannot reflect the fluorescent light P. With the aforementioned optical configuration, the optical path design can also be made more compact, so as to further reduce the space occupied by the optical engine module 510 in the projector 100.

In some embodiments, the dichroic mirror 514 in FIG. 12 can also be replaced by the dichroic mirror 114 in FIG. 7, and the light emitted by the solid state light emitter 111c of the first light source module 111 can reach the homogenizer 120 through or without the dichroic mirror 114.

Figure 13:
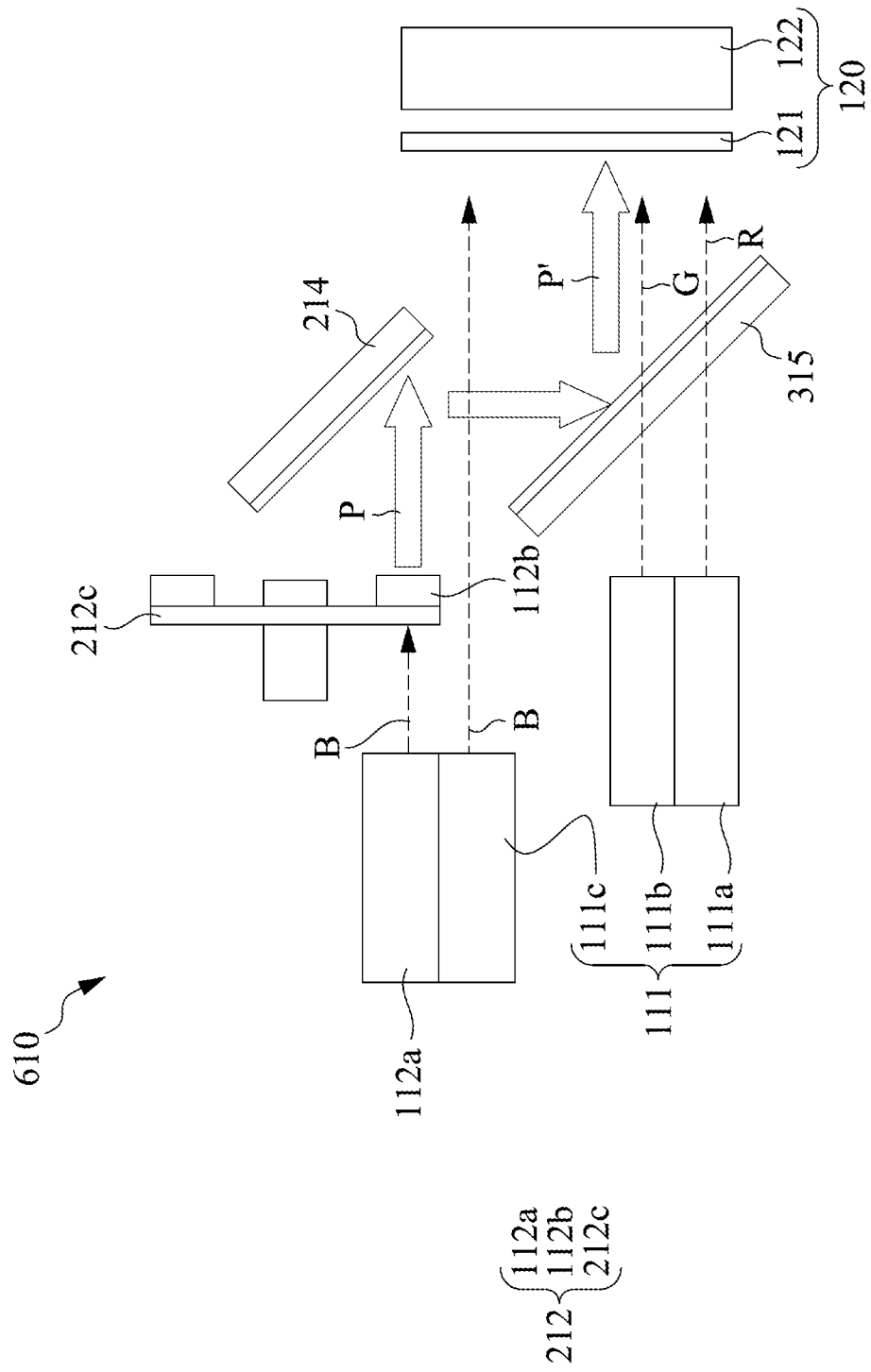
FIG. 13 is a schematic diagram of an optical engine module and the homogenizer according to another embodiment of the present disclosure.

Reference is made to FIG. 13. FIG. 13 is a schematic diagram of an optical engine module 610 and the homogenizer 120 according to another embodiment of the present disclosure. As shown in FIG. 13, in the present embodiment, the optical engine module 610 includes a first light source module 111, a second light source module 212, and a band-pass filter element 315, in which the first light source module 111 and the band-pass filter element 315 are the same as those in the embodiment shown in FIG. 12, and the second light source module 212 is the same as that in the embodiment shown in FIG. 6, so they will not be introduced again here, and reference may be made to the foregoing related introduction. In short, the substrate 212c of the second light source module 212 of the present embodiment is configured to transmit the light emitted by the light-emitting unit 112a, so that the light reaches the wavelength conversion material 112b and is converted into the fluorescent light P. The fluorescent light P is then sequentially reflected by the reflector 214 and the band-pass filter element 315 (and is filtered into the fluorescent light P') to reach the homogenizer 120. In addition, the light emitted by the solid state light emitter 111c directly reaches the homogenizer 120. With this optical configuration, the optical path design can also be made more compact, so as to further reduce the space occupied by the optical engine module 610 in the projector 100.

Figure 14:
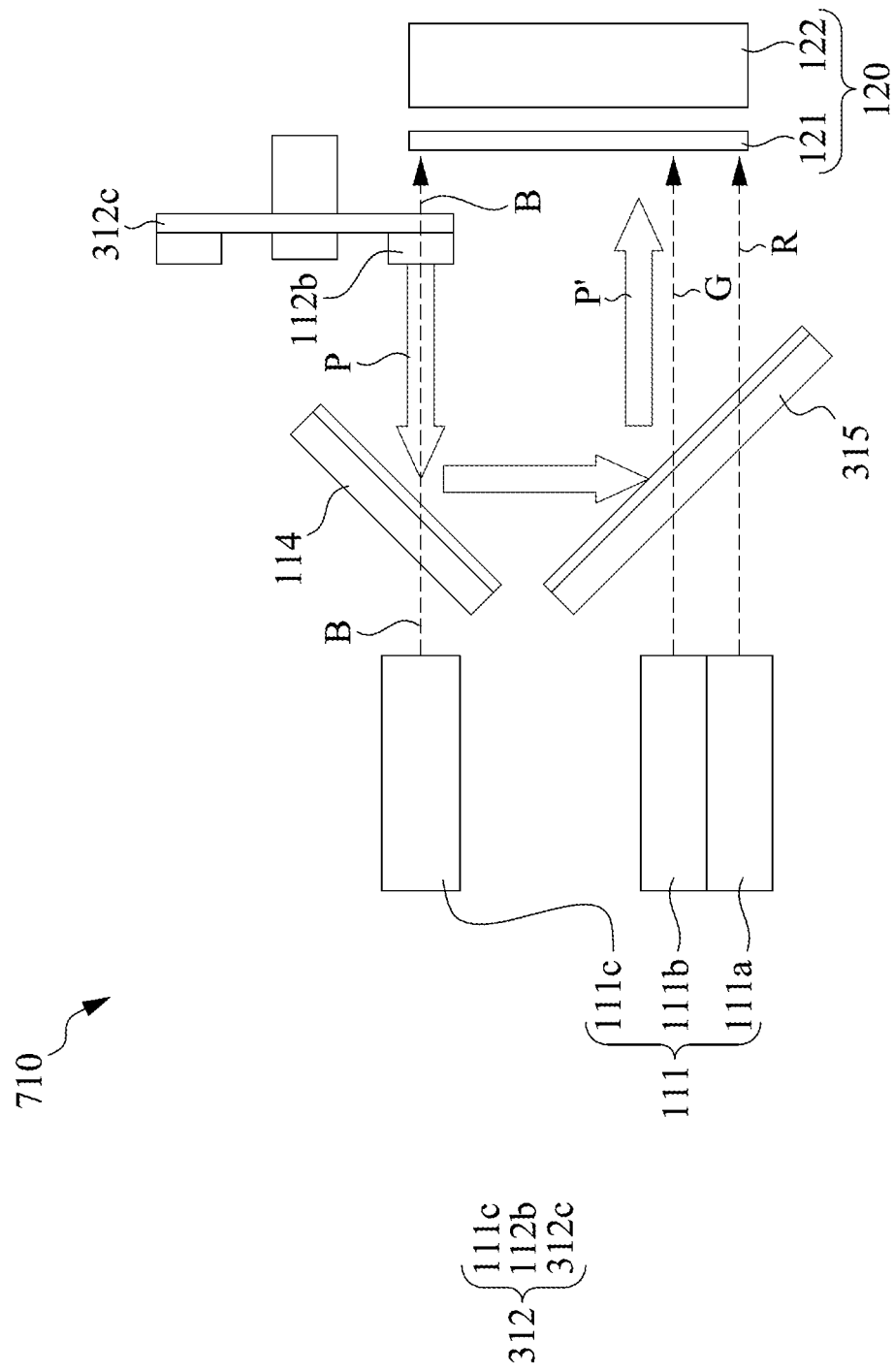
FIG. 14 is a schematic diagram of an optical engine module and the homogenizer according to another embodiment of the present disclosure.
Figure 15B:
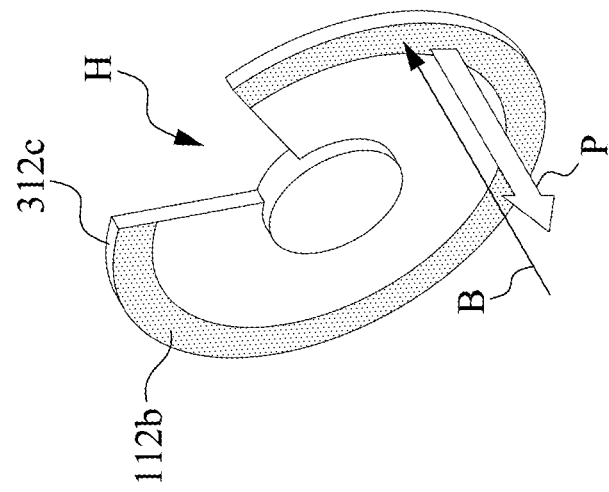
FIG. 15B is another perspective view showing the structure in FIG. 15A.
Figure 15A:
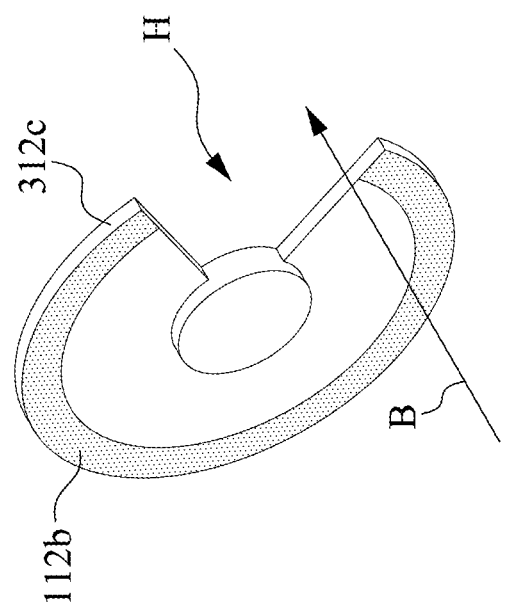
FIG. 15A is a perspective view of some components of a second light source module in FIG. 14.

Reference is made to FIGS. 14, 15A, and 15B. FIG. 14 is a schematic diagram of an optical engine module 710 and the homogenizer 120 according to another embodiment of the present disclosure. FIG. 15A is a perspective view of some components of a second light source module 312 in FIG. 14. FIG. 15B is another perspective view showing the structure in FIG. 15A. In the present embodiment, the optical engine module 710 includes a first light source module 111, a second light source module 312, a dichroic mirror 114, and a band-pass filter element 315, in which the first light source module 111 and the band-pass filter element 315 are the same as those in the embodiment shown in FIG. 12, so they will not be introduced again here, and reference may be made to the foregoing related introduction. A difference between the present embodiment and the embodiment shown in FIG. 2 is that the second light source module 312 of the present embodiment uses the solid state light emitter 111c of the first light source module 111 as a light-emitting unit. Another difference between the present embodiment and the embodiment shown in FIG. 2 is that the substrate 312c of the second light source module 312 of the present embodiment has a notch H, and the substrate 312c is a rotatable substrate. In addition, the notch H can be filled with a light-transmitting material such as glass to avoid air flow disturbance noise when the substrate 312c rotates. In practical applications, the substrate 312c may have more than one notch H. When the substrate 312c rotates so that the notch H moves to the light path of the light emitted by the solid state light emitter 111c, the light will directly pass through the notch H and reach the homogenizer 120. When the substrate 312c rotates so that the notch H moves away from the light path of the light emitted by the solid state light emitter 111c, the light is first converted into the fluorescent light P by the wavelength conversion material 112b, and then is sequentially reflected by the substrate 312c, the dichroic mirror 114, and the band-pass filter element 315 to the homogenizer 120. With this optical configuration, not only can the space occupied by the optical engine module 710 in the projector 100 be further reduced, but also the manufacturing cost of the optical engine module 710 and the projector 100 can be effectively reduced.

According to the foregoing recitations of the embodiments of the disclosure, it can be seen that in the optical engine module and the projector of the present disclosure, the first light source module capable of generating different color lights and the second light source module capable of generating fluorescent light are controlled by the controller, so that a first white light and a second white light can be mixed corresponding to a first light emitting mode and a second light emitting mode, respectively. In this way, the optical engine module and the projector of the present disclosure can obtain the maximum benefit of each light emitting mode.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An optical engine module, comprising:
   a first light source module comprising a plurality of solid state light emitters configured to respectively emit different color lights;
   a second light source module configured to emit fluorescent light; and
   a controller configured to:

drive the first light source module in a first light emitting mode, wherein the color lights are configured to be mixed to produce a first white light; and drive the first light source module and the second light source module in a second light emitting mode, wherein the color lights and the fluorescent light are configured to be mixed to produce a second white light.

2. The optical engine module of claim 1, further comprising:

a band-pass filter element, wherein at least two of the solid state light emitters and the second light source module are optically coupled to the band-pass filter element.

3. The optical engine module of claim 2, wherein the solid state light emitters are laser diodes and respectively have different light-emitting spectra, the band-pass filter element has a reflection spectrum, and the reflection spectrum is located between adjacent two of the light-emitting spectra.

4. The optical engine module of claim 3, wherein a light-emitting spectrum of the fluorescent light covers the reflection spectrum.

5. The optical engine module of claim 2, wherein the at least two of the solid state light emitters comprises a green laser diode and a red laser diode.

6. The optical engine module of claim 2, wherein the at least two of the solid state light emitters comprises a green laser diode, a red laser diode, and a blue laser diode.

7. The optical engine module of claim 1, wherein the second light source module comprises:

a light-emitting unit; and a wavelength conversion material configured to convert light emitted by the light-emitting unit into the fluorescent light.

8. The optical engine module of claim 7, wherein the light-emitting unit and one of the solid state light emitters are blue laser diodes.

9. The optical engine module of claim 7, wherein the second light source module uses one of the solid state light emitters as the light-emitting unit.

10. The optical engine module of claim 7, wherein the second light source module further comprises a substrate, and the wavelength conversion material is disposed on the substrate.

11. The optical engine module of claim 10, wherein the substrate is a reflective substrate.

12. The optical engine module of claim 11, further comprising:

a dichroic mirror located between the light-emitting unit and the substrate, wherein the dichroic mirror is configured to transmit the light emitted by the light-emitting unit and reflect the fluorescent light.

13. The optical engine module of claim 10, wherein the substrate is a transmissive substrate.

14. The optical engine module of claim 13, further comprising:

a reflector, wherein the wavelength conversion material and the substrate are located between the light-emitting unit and the reflector, and the reflector is configured to reflect the fluorescent light.

15. The optical engine module of claim 10, wherein the substrate has a notch configured to allow the light emitted by the light-emitting unit to pass through.

16. A projector, comprising:

the optical engine module of claim 1; and a projection module configured to:

sequentially process the color lights based on a first time sequence in the first light emitting mode; and sequentially process the color lights and the fluorescent light based on a second time sequence in the second light emitting mode.

17. The projector of claim 16, further comprising a homogenizer, wherein the first light source module and the second light source module are optically coupled to the homogenizer independently.

* * * * *